United States Patent
Reich et al.

(10) Patent No.: US 11,003,779 B2
(45) Date of Patent: *May 11, 2021

(54) CONTINUOUS DATABASE SECURITY AND COMPLIANCE

(71) Applicant: Imperva, Inc., San Mateo, CA (US)

(72) Inventors: Avidan Reich, Tel-Aviv (IL); Amichai Shulman, Tel-Aviv (IL); Michael Cherny, Tel-Aviv (IL)

(73) Assignee: Imperva, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,708

(22) Filed: Sep. 30, 2020

(65) Prior Publication Data

US 2021/0012007 A1 Jan. 14, 2021

Related U.S. Application Data

(63) Continuation of application No. 16/109,465, filed on Aug. 22, 2018, now Pat. No. 10,824,730.

(51) Int. Cl.
*H04L 29/06* (2006.01)
*G06F 21/57* (2013.01)
(Continued)

(52) U.S. Cl.
CPC ............ *G06F 21/57* (2013.01); *G06F 16/217* (2019.01); *G06F 21/566* (2013.01); *G06F 2221/033* (2013.01)

(58) Field of Classification Search
CPC .. G06F 21/6218; G06F 21/6227; G06F 21/57; G06F 21/60; G06F 21/62;
(Continued)

(56) References Cited

U.S. PATENT DOCUMENTS 7,278,161 B2 10/2007 Lingafelt et al.
7,353,539 B2 * 4/2008 Brawn ............... H04L 63/1433
709/224

(Continued)

OTHER PUBLICATIONS

"Oracle 12c Database Stig—Ver 1, Manual-xccdf," downloaded from https://nvd.nist.gov/ncp/checklist/667/download/2952, on May 3, 2018, 50 pages.

(Continued)

*Primary Examiner* — Hosuk Song
(74) *Attorney, Agent, or Firm* — Nicholson De Vos Webster & Elliott LLP

(57) ABSTRACT

A method by a security system for selectively triggering different ones of a plurality of database assessment scans for a database and detecting when non-compliant database configurations of the database are being used. The method includes monitoring for occurrences of a first class of database operations, responsive to detecting an occurrence of one or more database operations of the first class, selecting one or more subsets of the plurality of database assessment scans to be rerun, triggering performance of only the selected one or more of the subsets, identifying one or more non-compliant database configurations of the database based on accessing results of the selected one or more of the subsets, determining one or more security rules for detecting occurrences of database operations that make use of the identified one or more non-compliant database configurations, and applying the determined one or more security rules.

20 Claims, 7 Drawing Sheets

(51) Int. Cl.
*G06F 16/21* (2019.01)
*G06F 21/56* (2013.01)

(58) Field of Classification Search
CPC .... G06F 21/566; G06F 21/604; G06F 16/217; H04L 63/20
See application file for complete search history.

(56) References Cited

U.S. PATENT DOCUMENTS

| | | | |
|---|---|---|---|
| 7,584,508 B1 | 9/2009 | Kashchenko et al. | |
| 7,818,249 B2 * | 10/2010 | Lovejoy | G06Q 10/0635 705/38 |
| 7,836,501 B2 | 11/2010 | Sobel et al. | |
| 7,861,296 B2 | 12/2010 | Costea et al. | |
| 7,882,561 B2 * | 2/2011 | Costea | G06F 21/564 726/24 |
| 8,161,557 B2 * | 4/2012 | Costea | G06F 21/564 726/24 |
| 8,590,046 B2 | 11/2013 | Baikalov et al. | |
| 8,805,972 B1 * | 8/2014 | Merkulov | G06F 21/604 709/220 |
| 8,819,856 B1 | 8/2014 | Tiffe et al. | |
| 9,537,841 B2 * | 1/2017 | Schutz | H04L 63/1408 |
| 9,967,282 B2 * | 5/2018 | Thomas | H04L 63/0263 |
| 10,425,430 B2 | 9/2019 | Gilbert et al. | |
| 10,824,730 B2 * | 11/2020 | Reich | G06F 21/566 |

OTHER PUBLICATIONS

"Oracle 12c Database STIG," Checklist ID 667, Version 1, downloaded from https://nvd.nist.gov/ncp/checklist/667 on May 3, 2018, 383 pages.

Center for Internet Security, "CIS Oracle Database 12c Benchmark," v1.2.0, Mar. 31, 2016, 163 pages.

Imperva., "Imperva SecureSphere Data Security," datasheet, 2018, 7 pages.

Imperva., "Imperva SecureSphere Discovery and Assessment," datasheet, 2017, 3 pages.

Non-Final Office Action, U.S. Appl. No. 16/109,465, dated Apr. 2, 2020, 7 pages.

Notice of Allowance, U.S. Appl. No. 16/109,465, dated Jul. 8, 2020, 5 pages.

* cited by examiner

CONTINUOUS DATABASE SECURITY AND COMPLIANCE

CROSS-REFERENCE TO RELATED APPLICATIONS

This application is a continuation of U.S. application Ser. No. 16/109,465, filed Aug. 22, 2018 (now U.S. Pat. No. 10,824,730 issued Nov. 3, 2020), which is hereby incorporated by reference.

TECHNICAL FIELD

Embodiments of the invention relate to the field of database security and compliance, and more specifically, to providing continuous database security and compliance.

BACKGROUND ART

Database servers are computer programs that provide database services to other computer programs, which are typically running on other electronic devices and adhering to the client-server model of communication. Many web applications utilize database servers (e.g., relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases. Thus, in some instances a database server can receive a SQL query from a client (directly from a database client process or client end station using a database protocol, or indirectly via a web application server that a web server client is interacting with), execute the SQL query using data stored in the set of one or more database objects of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In a cloud database (a database that runs on a cloud platform and that is provided as a database service), identifiers are used instead of database keys, and relationships are used instead of foreign keys. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

Keeping a database compliant with industry best practices is critical for protecting the database from security breaches and passing database compliance audits. Organizations typically perform periodic database assessment scans on its databases to ensure that their databases comply with industry best practices and/or regulatory requirements. The results of these database assessment scans provide a snapshot of the compliance status of the databases at a particular point in time.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
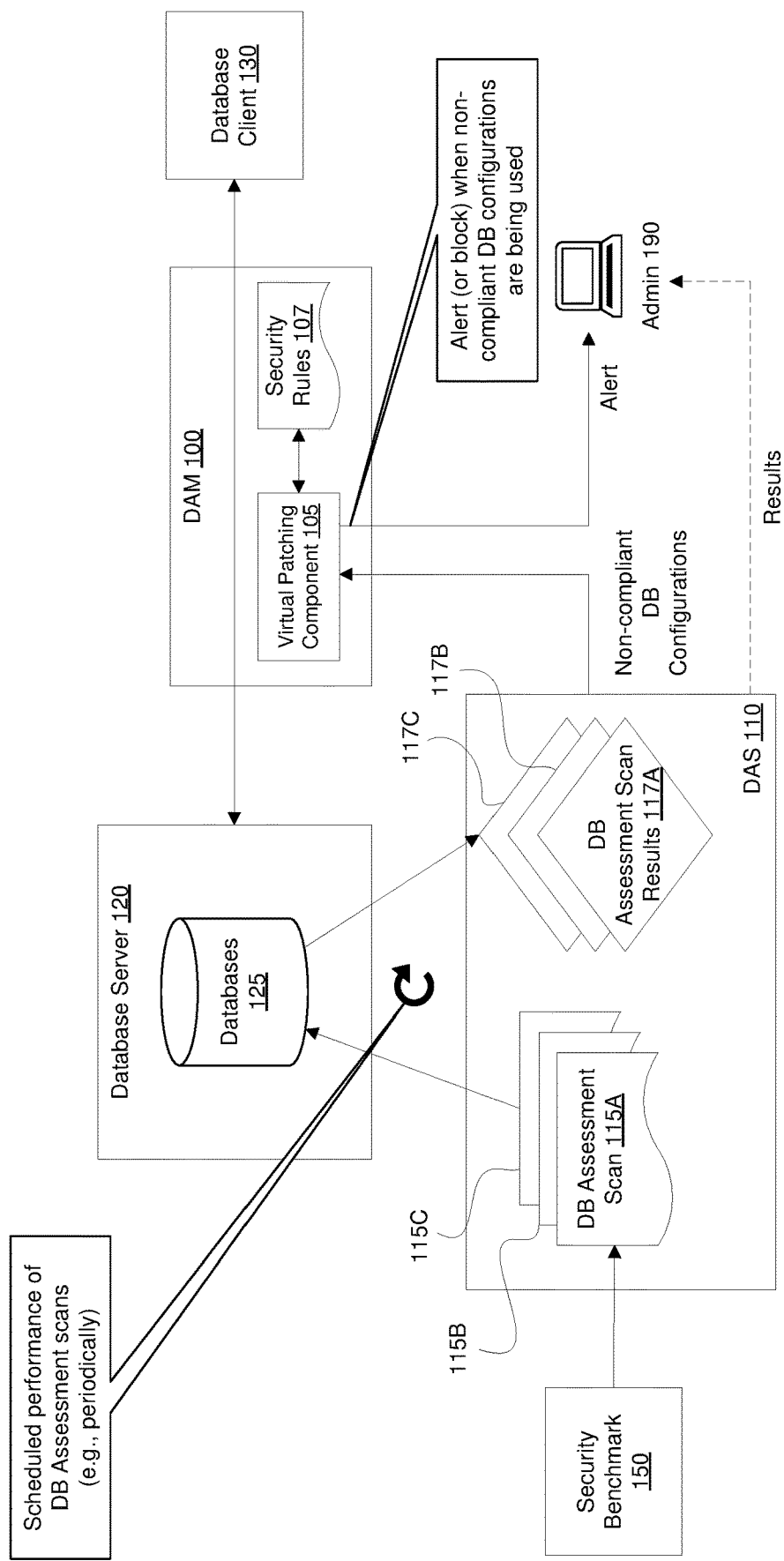
FIG. 1 is a block diagram of a system that provides virtual patching for database compliance, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As mentioned above, organizations typically perform periodic database assessment scans on its databases to ensure that their databases comply with industry best practices and/or regulatory requirements. Performing database assessment scans can be very expensive in terms of computational cost and human effort, particularly for large organizations, which may have thousands of databases. As a result, many organizations perform database assessment scans infrequently (e.g., once a quarter or once a year). If the result of a database assessment scan indicates that a database is non-compliant, then the security administrator asks the database administrator (DBA) or other database expert to manually configure the database to be compliant, which can be a tedious and time-consuming task that is prone to human error. Moreover, even if the database is manually reconfigured to be compliant, the compliance status of the database can change thereafter depending on the database operations that are performed on the database, and this change in compliance status will not be discovered until the next scheduled database assessment scan is performed. This leaves the database vulnerable to security breaches in between scheduled database assessment scans. Thus, this approach to database compliance is expensive in terms of computational cost and human effort and leaves a database vulnerable to security breaches in between scheduled database assessment scans.

Some of the embodiments described herein below leverage database activity monitoring capabilities to monitor for the occurrence of database operations that make use of the non-compliant database configurations of a database (e.g., that were identified based on performing database assessment scans on the database). When it is detected that a non-compliant database configuration is being used, an alert may be generated (e.g., to notify a security administrator) and/or the offending database traffic may be blocked. This provides a "virtual patching" mechanism for database compliance that helps protect the database from attacks that might exploit the non-compliant database configurations of the database. The virtual patching is "virtual" in the sense that it provides a temporary fix until a more permanent fix can be made (e.g., DBA reconfigures the database to be compliant).

Also, some embodiments described herein below additionally or alternatively leverage database activity monitoring capabilities to monitor for the occurrence of database operations that could potentially affect the results of one or more database assessment scans. When an occurrence of a database operation is detected that could potentially affect the results of one or more database assessment scans, only those database assessment scans whose results could potentially be affected are selected to be rerun. This provides a "just-in-time" database assessment scan mechanism that keeps the results of the database assessment scans up to date in real-time, which avoids the need to periodically perform the expensive full database assessment scans. The results of performing the just-in-time database assessment scans can also be used to update the virtual patching mechanism to detect when any non-compliant database configurations identified by the just-in-time database assessment scans are being used.

FIG. 1 is a block diagram of a system that provides virtual patching for database compliance, according to some embodiments. As shown in the diagram, the system includes a database activity monitor (DAM) 100, a database assessor (DAS) 110, a database server 120, and a database client 130. The database server 120 hosts one or more databases 125. Each database 125 may include a number of database objects and each database object may include a number of records. In an embodiment where a database 125 is implemented as a relational database, the database objects may be realized as tables and the records may be realized as rows in the tables. The database client 130 may establish one or more connections with the database server 120 to access the databases 125 hosted by the database server 120. The database client 130 may submit various commands (e.g., Structured Query Language (SQL) queries) to the database server 120 over a connection established with the database server 120 to access the databases 125. These commands could include, for example, commands to read records from a database object of a database 125, modify the records of a database object of a database 125, delete records from a database object of a database 125, and/or execute commands on the operating system (OS). For sake of simplicity and clarity, the diagram shows a single database client 130 communicating with the database server 120. However, it should be understood that more than one database client 130 may communicate with the database server 120 to access the databases 125 hosted by the database server 120; additionally or alternatively, there may be multiple database servers 120 hosting the database(s) 125.

The DAS 110 can perform database assessment scans 115 on the databases 125 to determine whether the databases 125 comply with industry best practices and/or regulatory requirements. As shown in the diagram, the DAS 110 includes database assessment scans 115A, 115B, and 115C. Collectively, these database assessment scans form a "full" set of database assessment scans 115. In one embodiment, the database assessment scans 115 are developed based on a database security benchmark 150. A database security benchmark 150 provides a baseline for what is considered to be a "secure" database configuration. Examples of database security benchmarks include, but are not limited to, the Center for Internet Security (CIS) benchmarks, the Defense Information Systems Agency (DISA) Security Technical Implementation Guides, and the General Data Protection Regulation (GDPR) benchmarks. A full set of database assessment scans 115 can include separate database assessment scans for identifying non-compliant database configurations related to different aspects of a database 125. For example, database assessment scans 115A, 115B, and 115C could be database assessment scans 115 related to user authorization, user profile management, and system parameters respectively. While three database assessment scans 115 are shown in the diagram, it should be understood that a full set of database assessment scans 115 may include more or less database assessment scans 115. As used herein, a non-compliant database configuration refers to any configuration/setting/state/status/content of a database that is not compliant with the recommendations of a database security benchmark 150 or other type of guideline for database best practices. Performing the database assessment scans 115 may involve executing queries on the database 125 and/or running OS scripts. The DAS 110 may perform the database assessment scans 115 to produce database assessment scan results 117 (e.g., results 117A, 117B, and 117C depicted in the diagram may correspond to database assessment scan 115A, 115B, and 115C, respectively). The results 117 indicate the non-compliant database configurations of the database 125 that were identified based on performing the database assessment scans 115 (e.g., database configurations that do not comply with or meet the standard of the database security benchmark 150). For example, the results 117 may indicate that a database 125 is non-compliant because it has users that have default passwords and also indicate the list of users that were found to have default passwords. As another example, the results 117 may indicate that a database 125 is non-compliant because it has unauthorized database links and also indicate the list of unauthorized database links that were found. While in some embodiments the DAS 110 waits until an independent event occurs to rerun all of the plurality of database assessment scans (e.g., the DAS 110 performs the full set of database assessment scans 115 according to a pre-defined schedule (e.g., periodically—once a month or once a year) and/or on demand (e.g., responsive to a request from a DBA)), other embodiments may operate differently (e.g., utilize a "just-in-time" database assessment scan mechanism as described in FIG. 3).

The DAM 100 monitors database activity of the databases 125, for example, by monitoring the communications between the database client 130 and the database server 120. While in one embodiment the DAM 100 is implemented within a security gateway that sits inline between the database client 130 and the database server 120, other embodiments implement the DAM 100 differently (e.g., the DAM 100 may tap into (or "sniff") the communications between the database client 130 and the database server 120 without sitting inline). While the diagram shows the DAM 100 and the DAS 110 as being separate components, in some embodiments, the DAM 100 and the DAS 110 are integrated, for example, as part of an enterprise security system. In one embodiment, the functionalities of the DAM 100 and/or the DAS 110 are implemented in a cloud environment. The DAM 100 and the DAS 110 can be implemented by one or more electronic devices. While a certain configuration of the components is shown in the diagrams, it should be understood that the configuration is shown by way of example, and not intended to be limiting. Other embodiments may utilize a different configuration.

While the results 117 indicate the non-compliant database configurations of the database 125, it does not necessarily reflect when such non-compliant database configurations are used thereafter to access the database(s) 125. As shown in the diagram, the DAM 100 includes a virtual patching component 105 that monitors accesses to the database 125 to detect when (if at all) non-compliant database configurations of the database 125 are being used (that is, the virtual patching component 105 detects occurrences of database operations that make use of the non-compliant database configurations of a database 125 (e.g., that were identified based on performing database assessment scans on the database 125)). The virtual patching component 105 may identify the non-compliant database configurations of the database 125 based on accessing the database assessment scan results 117 produced by the DAS 110. In one embodiment, the DAS 110 provides the database assessment scan results 117 to the virtual patching component 105—a "push" mechanism. In other embodiments, the DAS 110 makes the database assessment scan results 117 accessible to the virtual patching component 105 (e.g., by storing the results 117 in a storage location accessible to the virtual patching component 105)—a "pull" mechanism. In one embodiment, after the virtual patching component 105 has identified the non-compliant database configurations of the database 125, it determines one or more security rules 107 for detecting occurrences of database operations that make use of the identified non-compliant database configurations and applies these security rules 107 while monitoring accesses by database clients 130 to the database 125 (that is, the virtual patching component 105 applies the security rules 107 to the traffic from the database clients 130 to the databases 125 (and in some embodiments, the database responses)). In one embodiment, the virtual patching component 105 determines the one or more security rules 107 based on accessing a mapping of different types of non-compliant database configurations to different types of security rules. Table I shows an exemplary mapping of non-compliant database configurations to security rules, as well as some details of those security rules. This example and other examples provided herein use assume that the database 125 is an Oracle database and thus mention constructs that are specific to Oracle databases (e.g., UTL_FILE, PUBLIC role, etc.). It should be understood, however, that the techniques described herein can also be implemented for other types of databases 125.

TABLE I

| Non-compliant Database Configuration | Security Rule | Details of Security Rule |
|---|---|---|
| Users have default passwords | Alert when user with default password logs in | Operation = login<br>User belongs to the list of users that have default passwords (identified by a database assessment scan) |
| Users are authorized to access an unauthorized system table | Alert when user accesses unauthorized system table | Operation = select/insert/update/delete<br>The {user, table} tuple belongs to the list of user and table tuples (identified by a database assessment scan) |
| Users are authorized to execute an unauthorized package | Alert when user executes unauthorized package | Operation = execute<br>The {user, package} tuple belongs to the list of user and package tuples (identified by a database assessment scan) |

TABLE I-continued

| Non-compliant Database Configuration | Security Rule | Details of Security Rule |
|---|---|---|
| Unauthorized database links exist | Alert when accessing objects using unauthorized database links | Operation = select/insert/update/delete<br>Database name belongs to the list of unauthorized database links (identified by a database assessment scan) |
| System privilege is granted to PUBLIC role | Alert when user uses system privilege that was granted only via PUBLIC role | Operation = create-table/alter-table/drop-table<br>User does not belong to the list of authorized users that were granted the system privilege explicitly, and not via PUBLIC role (identified by a database assessment scan) |
| PUBLIC role has access to unauthorized package | Alert when user uses execute privileges on unauthorized package that were granted only via PUBLIC role | Operation = execute<br>Package belongs to the list of the non-complaint grants to PUBLIC role (identified by a database assessment scan)<br>User does not belong to the list of authorized users that got the execute privilege on the package explicitly, and not via PUBLIC role (identified by another database assessment scan) |

According to the first row shown in Table I, if the database 125 has users that have default passwords, then the database assessment scan results 117 will reflect this and also identify those one or more users, and the virtual patching component 105 applies a security rule to generate an alert responsive to occurrences of those users attempting to log in to the database 125. For example, this security rule can be applied based on checking for login operations where the user attempting to log in belongs to the list of users that have a default password that was identified by a database assessment scan 115. According to the second row shown in Table I, if the database 125 has users that are authorized to access an unauthorized system table, then the database assessment scan results 117 will reflect this and also identify the user and table tuples (e.g., represented as {user, table}) that are unauthorized, and the virtual patching component 105 applies a security rule to generate an alert responsive to occurrences of a user accessing an unauthorized system table. For example, this security rule can be applied based on checking for select/insert/update/delete operations where the {user, table} tuple belongs to the list of user and table tuples that was identified by a database assessment scan 115 as being unauthorized. According to the third row shown in Table I, if the database 125 has users that are authorized to execute procedure/functions on an unauthorized package, then the database assessment scan results 117 will reflect this and also identify the user and package tuples (e.g., represented as {user, package}) that are unauthorized, and the virtual patching component 105 applies a security rule to generate an alert responsive to occurrences of a user executing procedure/function on an unauthorized package. For example, this security rule can be applied based on checking for execute operations where the {user, package} tuple belongs to the list of user and package tuples that was identified by a database assessment scan 115 as being unauthorized. According to the fourth row shown in Table I, if unauthorized database links exist in the database 125, then the database assessment scan results 117 will reflect this and also identify those unauthorized database links, and the virtual patching component 105 applies a security rule to generate an alert responsive to occurrences of those unauthorized database links being accessed (or attempted to being accessed). For example, this security rule can be applied based on checking for select/insert/update/delete operations where the database link name belongs to the list of unauthorized database link names that was identified by a database assessment scan 115. According to the fifth row shown in Table I, if a system privilege (e.g., a privilege to execute a data definition language (DDL) statement such as "create table," "alter table," "drop table," "create user," and "grant," etc.) is granted to the PUBLIC role, then the database assessment scan results 117 will reflect this, and the virtual patching component 105 applies a security rule to generate an alert responsive to occurrences of a user using a system privilege that was granted only via the PUBLIC role. For example, this security rule can be applied based on checking for create table, alter table, drop table, or grant operations where the user performing the operation does not belong to the list of authorized users that were granted the system privilege explicitly (and not via the PUBLIC role) that was identified by a database assessment scan 115. According to the sixth row shown in Table I, if execute privileges on unauthorized package (privileges to execute package procedures/functions) are granted to the PUBLIC role (PUBLIC role has access to the unauthorized package), then the database assessment scan results 117 will reflect this and also identify those packages for which privilege to execute their procedures/functions are granted to the PUBLIC role, and the virtual patching component 105 applies a security rule to generate an alert responsive to occurrences of a user using the execute privilege on the package that were granted only via the PUBLIC role. For example, security rule can be applied based on checking for execute operations on the a package that belongs to the list of non-compliant grants to the PUBLIC role that was identified by a database assessment scan 115 (e.g., UTL_FILE package), and where the user does not belong to the list of authorized users that were explicitly granted an execute privilege on that package (and not via the PUBLIC role) that was identified by another database assessment scan 115. It should be noted that while the security rules shown in Table I show rules to generate an alert responsive to occurrences of a non-compliant database configuration being used, security rules may also be configured to perform other functionality to help protect against the use of non-compliant database configurations such as blocking database operations that use a non-compliant database configuration (e.g., if the DAM 100 is implemented inline).

In one embodiment, the virtual patching component 105 applies security rules 107 in a "what-if" mode. In this mode, the virtual patching component 105 applies one or more security rules 107 for a certain period of time (e.g., a month). If no alert/block is invoked during this period of time, the virtual patching component 105 may notify the DBA (or notify the security administrator who in turn notifies the DBA) as such. If no alert/block is invoked, this may indicate that the DBA can mitigate the relevant non-compliant database configurations (e.g., by reconfiguring the database), and this will likely not break any application/job. For example, if a privilege is granted to a user that is considered non-compliant, it is difficult for the DBA to know whether revoking the privilege will cause an application/job to break. However, if a security rule (for detecting occurrences of database operations that make use of the privilege) was applied for a certain period of time (e.g., a month) and no alert/block was invoked, then the DBA can have more confidence that the privilege is not being used and can consider revoking the privilege. The "what-if" mode can help decrease human effort when mitigating non-compliant database configurations of a database.

In one embodiment, the DAS 110 provides the results 117 to the administrator 190 (e.g., security administrator and/or DBA) and/or other entity that is responsible for collecting and/or analyzing the results 117. This allows the administrator 190 to mitigate any non-compliant database configurations indicated by the results 117 (e.g., by reconfiguring the database 125 to be compliant).

The virtual patching component 105 thus provides a virtual patching mechanism for database compliance. The virtual patching mechanism helps protect a database 125 against database activity that make use of non-compliant database configurations. It should be noted that this virtual patching mechanism is different from traditional virtual patching mechanisms, which are typically for source code vulnerabilities. These traditional virtual patching mechanisms provide a temporary fix for software vulnerabilities until the software is patched. In contrast, the virtual patching mechanism described herein are for database compliance, and are meant to protect a database 125 when it has non-compliant database configurations and one or more of these non-compliant database configurations are used to access the database 125.

Figure 2:
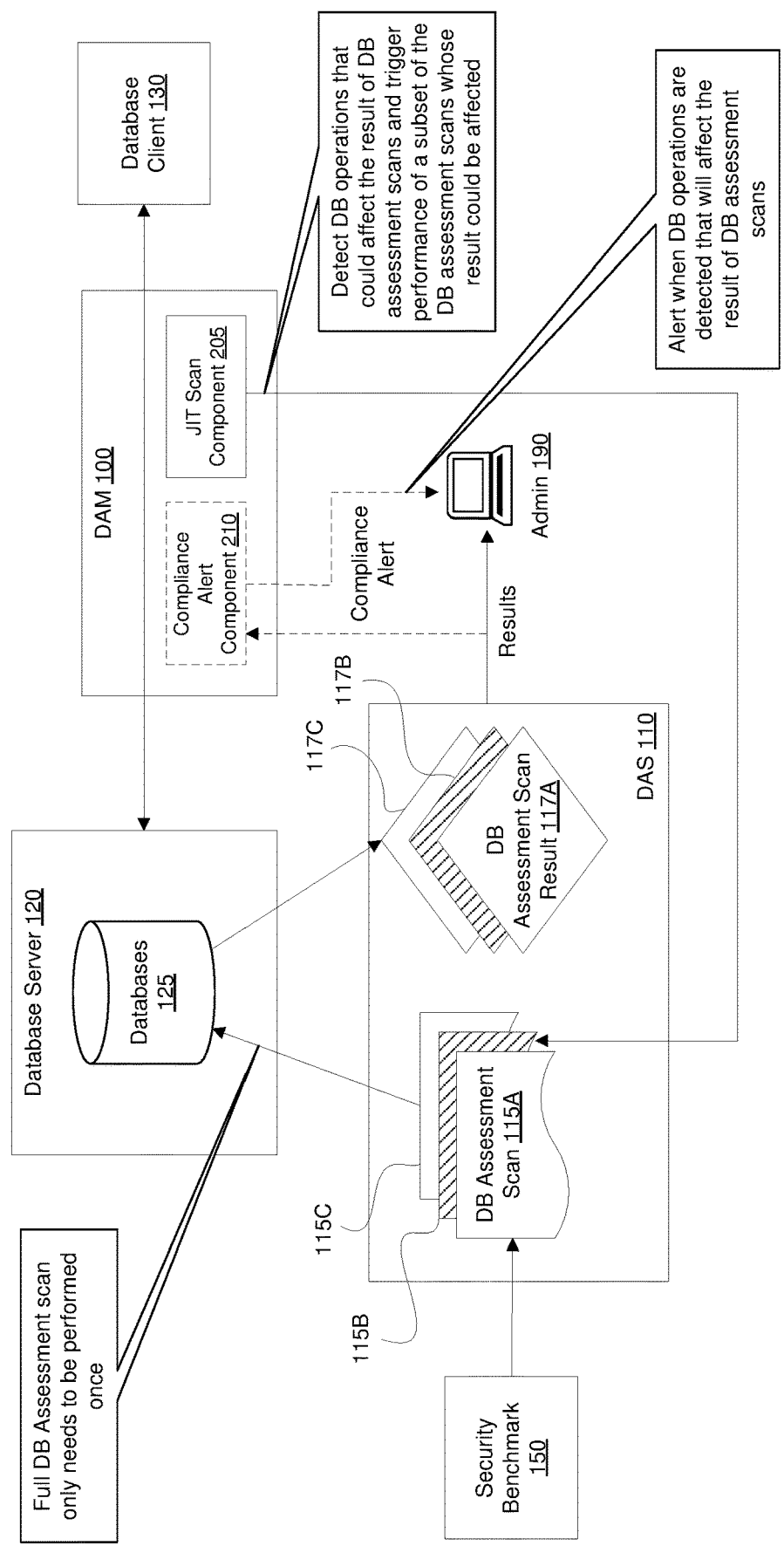
FIG. 2 is a block diagram of a system for providing just-in-time database assessment scans and compliance alerts, according to some embodiments.

FIG. 2 is a block diagram of a system for providing just-in-time database assessment scans and compliance alerts, according to some embodiments. As shown in the diagram, the system includes similar components to those shown in FIG. 1 such as a DAM 100, a DAS 110, a database server 120, and a database client 130. These components generally operate in a similar manner as described above with reference to FIG. 1, and thus only the differences are highlighted below for the sake of brevity.

In this embodiment, the DAM 100 includes a just-in-time scan (JIT) scan component 205. The JIT scan component 205 monitors accesses by database clients 130 to the database 125 to detect occurrences of database operations that could affect the result 117 of a database assessment scan 115 (that is, the JIT scan component 205 monitors the traffic from the database clients 130 to the databases 125 (and in some embodiments, the database responses)). When the JIT scan component 205 detects an occurrence of a database operation that could potentially affect the result 117 of at least one database assessment scan 115, it triggers performance of only those database assessment scans 115 whose results 117 could be affected (e.g., by causing the DAS 110 to perform those database assessment scans 115). For example, if the JIT scan component 205 detects an occurrence of a database operation that could potentially affect the result 117 of at least one database assessment scan 115, it determines the database assessment scans 115 whose results 117 could be affected by that database operation (e.g., the shaded database assessment scan 115B shown in FIG. 2). The JIT scan component 205 may then cause the DAS 110 to perform only those database assessment scans whose results could be affected (e.g., only the shaded database assessment scan 115B). For example, if the JIT scan component 205 detects an occurrence of a database operation that grants a privilege to a user, the JIT scan component 205 may cause the DAS 110 to rerun only the one or more of the database assessment scans 115 that relate to identifying non-compliant user privilege configurations. As another example, if the JIT scan component 205 detects an occurrence of a database operation that creates or modifies a user profile, the JIT scan component 205 may cause the DAS 110 to rerun only the one or more of the database assessment scans 115 related to identifying non-compliant user profile configurations. Rerunning a subset of the database assessment scans 115 may cause the corresponding results 117 to be updated (e.g., rerunning the shaded database assessment scan 115B may cause the corresponding result 117B shown in FIG. 2 to be updated). The DAS 110 may provide any updated results 117 to the administrator 190 (e.g., security administrator and/or DBA) and/or other entity that is responsible for collecting and/or analyzing the results 117.

While in one embodiment the JIT scan component 205 triggers performance of the database assessment scans 115 whose results might be affected each time it detects an occurrence of a database operation that could affect the result of at least one database assessment scan 115, other embodiments additionally or alternatively trigger the performance of the database assessment scans 115 whose results might be affected responsive to one or more other types of events (e.g., responsive to a determination that a threshold number of occurrences of database operations that might affect a result 117 of a database assessment scan 115 have been detected, responsive to a determination that a threshold number of database assessment scans 115 that need to be rerun have accumulated, responsive to a predefined schedule (e.g., periodically (responsive to a time period expiring)), etc.).

In one embodiment, the JIT scan component 205 determines the database assessment scans 115 whose results could be affected based on accessing a mapping of database operations to the database assessment scans 115 whose results could be affected. Table II shows an exemplary mapping of database operations to the database assessment scans 115 whose results could be affected (the database assessment scans 115 listed in Table II are based on the CIS Oracle Database Benchmark).

TABLE II

| Database Operation | Potentially Affected Database Assessment Scan |
| --- | --- |
| Grant or revoke a privilege to a user | Unauthorized Users Granted DBA Role; Unauthorized Users Have Access to SYS.USER$ Table; and Unauthorized Users Granted CREATE ANY LIBRARY Privilege |
| Create or modify a user | Users with Default Passwords; and SYSTEM Tablespace Assigned to Non-Default Users |

TABLE II-continued

| Database Operation | Potentially Affected Database Assessment Scan |
|---|---|
| Create or modify a user profile | Profiles with FAILED_LOGIN_ATTEMPTS Set Too High; Profiles with too long PASSWORD_LIFE_TIME; and The PASSWORD_VERIFY_FUNCTION parameter is not set for all profiles |
| Modify a system parameter | Oracle AUDIT_SYS_OPERATIONS Parameter is Disabled; and Oracle REMOTE_OS_AUTHENT Parameter is Enabled |

According to the first row of Table II, if the JIT scan component 205 detects the occurrence of a database operation that grants or revokes a privilege to a user, then the JIT scan component is to trigger performance of the following database assessment scans 115: 1) unauthorized users granted DBA role; 2) unauthorized users have access to SYS.USERS table; and 3) unauthorized users granted the CREATE ANY LIBRARY privilege. According to the second row of table II, if the JIT scan component 205 detects the occurrence of a database operation that creates or modifies a user, then the JIT scan component 205 triggers performance of the following database assessment scans 115: 1) users with default passwords; and 2) SYSTEM tablespace assigned to non-default users. According to the third row of Table II, if the JIT scan component 205 detects the occurrence of a database operation that creates or modifies a user profile, then the JIT scan component 205 triggers performance of the following database assessment scans 115: 1) profiles with FAILED_LOGIN_ATTEMPTS set too high; 2) profiles with too long PASSWORD_LIFE_TIME; and 3) the PASSWORD_VERIFY_FUNCTION parameter is not set for all profiles. According to the fourth row of Table II, if the JIT scan component 205 detects the occurrence of a database operation that modifies a system parameter, then the JIT scan component 205 triggers performance of the following database assessment scans 115: 1) AUDIT_SYS_OPERATIONS parameter is disabled; and 2) REMOTE_OS_AUTHENT parameter is enabled. While in one embodiment the database assessment scans 115 include each of the above listed scans, alternative embodiments may include more, less, and/or different database assessment scans 115.

It should be noted that the JIT scan component 205 detects occurrences of database operations that have the potential to affect the result of at least one of the database assessment scans 115, but these database operations may not necessarily end up affecting the corresponding database assessment scan results 117 of a database assessment scan 115. Thus, the database assessment scans 115 whose results might be potentially affected need to be rerun to determine whether their corresponding results 117 are affected.

The JIT scan component 205 thus performs database operation-based selective database assessment scanning to keep the results 117 of the database assessment scans 115 up to date. The full set of database assessment scans 115 only needs to be performed once. After that, the JIT scan component 205 can selectively trigger performance of only those database assessment scans 115 (typically a subset of the full set of database assessment scans 115) whose results 117 might be affected by the database operations performed on the database 125. This helps reduce the computational cost for determining the compliance status of the database 125.

In one embodiment, the DAM 100 includes a compliance alert component 210. In contrast to the JIT scan component 205 which monitors accesses to the database 125 to detect occurrences of database operations that could potentially affect the results 117 of database assessment scans 115, the compliance alert component 210 monitors accesses to the database 125 to detect occurrences of database operations that will definitively affect the results 117 of database assessment scans 115. When the compliance alert component 210 detects an occurrence of a database operation that will affect the result 117 of a database assessment scan 115, it generates a compliance alert (e.g., to an administrator 190 (e.g., security administrator and/or DBA) and/or other entity that is responsible for collecting, analyzing, and/or responding to compliance alerts). A compliance alert is a type of alert that indicates that the compliance status of a database 125 has changed. In one embodiment, the compliance alert may include an indication of the database operation that caused the compliance alert to be generated and/or the database assessment scan whose result is affected. Table III shows exemplary database operations that can cause a compliance alert to be generated, as well as some details of those database operations.

TABLE III

| Database Operation | Detail of Database Operation |
|---|---|
| Create or modify user with SYSTEM tablespace | Operation = create/alter user Tablespace = SYSTEM |
| Grant privileges on system table to non-DBA users | Operation = grant Schema = sys Table belongs to a list of system tables (identified by a database assessment scan) User does not belong to the list of DBAs (identified by a database assessment scan) |
| Grant execute privilege on UTL_FILE package to PUBLIC role | Operation = grant Package = UTL_FILE Grantee = PUBLIC |
| Create or modify a user profile with PASSWORD_LIFE_TIME that is too long | Operation = create/alter profile PASSWORD_LIFE_TIME = UNLIMITED/NULL |

According to the first row of Table III, the compliance alert component 210 is to generate an alert if it detects an occurrence of a database operation that creates or modifies a user with SYSTEM tablespace. This can be detected by checking for create/alter user operations where the tablespace is SYSTEM. According to the second row of table III, the compliance alert component 210 is to generate an alert if it detects a database operation that grants privileges on a system table to non-DBA users. This can be detected by checking for grant operations where the schema is sys, the table belongs to a list of system tables that was identified by a database assessment scan 115 (e.g., the compliance alert component 210 may receive the database assessment scan results 117 (or the non-compliant database configurations indicated by the results 117) from the DAS 110), and the user does not belong to the list of DBAs that was identified by a database assessment scan 115. In one embodiment, the compliance alert component 210 receives the results 117 of the database assessment scans 115 from the DAS 110 and the results 117 include the list of system tables and the list of DBAs mentioned above. According to the third row of Table III, the compliance alert component 210 is to generate an alert if it detects a database operation that grants an execute privilege on UTL_FILE package to the PUBLIC role. This can be detected by checking for grant operations where the package is UTL_FILE and the grantee is PUBLIC. According to the fourth row of Table III, the compliance alert component 210 is to generate an alert if it detects an occurrence of a database operation that creates or modifies a user profile that has a PASSWORD_LIFE_TIME that is too long. This can be detected by checking for create/alter profile operations where the PASSWORD_LIFE_TIME is UNLIMITED/NULL (or longer than a predefined threshold length).

The compliance alert component 210 thus generates a compliance alert when the compliance status of a database 125 is changed (e.g., based on detecting an occurrence of a database operation that is known to change the result 117 of a database assessment scan 115). The compliance alert mechanism may help mitigate insider attacks. For example, with the existing approach where the full set of database assessment scans 115 are performed periodically, a malicious DBA could perform database operations that cause the database to be non-compliant, exploit the non-compliance, and then reconfigure the database to be compliant before the next scheduled database assessment scan so that the DBA's malicious activity goes undetected. However, with embodiments that implement the compliance alert mechanism, any database operations that would cause a change in the compliance status of the database 125 would be detected by the compliance alert component 210 in real-time and an alert would be generated.

Thus, the JIT scan component 205 keeps the results 117 of the database assessment scans 115 up to date by selectively triggering database assessment scans 115 whose results might be affected due to the occurrence of certain database operations. The JIT scan component 205 does this by monitoring for occurrences of a first class of database operations that have been determined to require only rerunning subsets of the full set of database assessment scans 115 to determine whether results 117 of the full set of database assessment scans 115 have changed, where different database operations of the first class require different subsets of the full set of database assessment scans 115 to be rerun to determine whether the results 117 of the full set of database assessment scans 115 have changed. Responsive to detecting an occurrence of one or more database operations of the first class, the JIT scan component 205 selects one or more of the subsets to be rerun based on which of the database operations of the first class occurred. The JIT scan component 205 then triggers performance of only the selected one or more of the subsets to determine whether the results 117 of the full set of database assessment scans 115 have changed (rather than waiting for an independent event (e.g., a periodically scheduled full database assessment scan) to rerun all of the plurality of database assessment scans 115).

The compliance alert component 210 generates an alert when it detects an occurrence of a database operation that will affect the result 117 of a database assessment scan 115. The compliance alert component 210 does this by monitoring for occurrences of a second class of database operations that have been determined not to require rerunning any of the database assessment scans 115 in the full set of database assessment scans 115 to know that a result 117 of at least one of the database assessment scan 115 will be affected. The compliance alert component 210 generates an alert in response to detecting an occurrence of one or more database operations of the second class. In one embodiment, the first and second classes are non-overlapping, and the JIT scan component 205, responsive to the occurrence of one or more database operations of the second class, also selects one or more of the subsets to be rerun based on which of the database operations of the second class occurred. In an alternative embodiment, while not all of the databases operations in the first class are in the second class, all of the database operations in the second class are considered to be in the first class (and thus, occurrences of database operations of the second class are also occurrences of the first class and cause the database scans that will be affected to be rerun).

Figure 3:
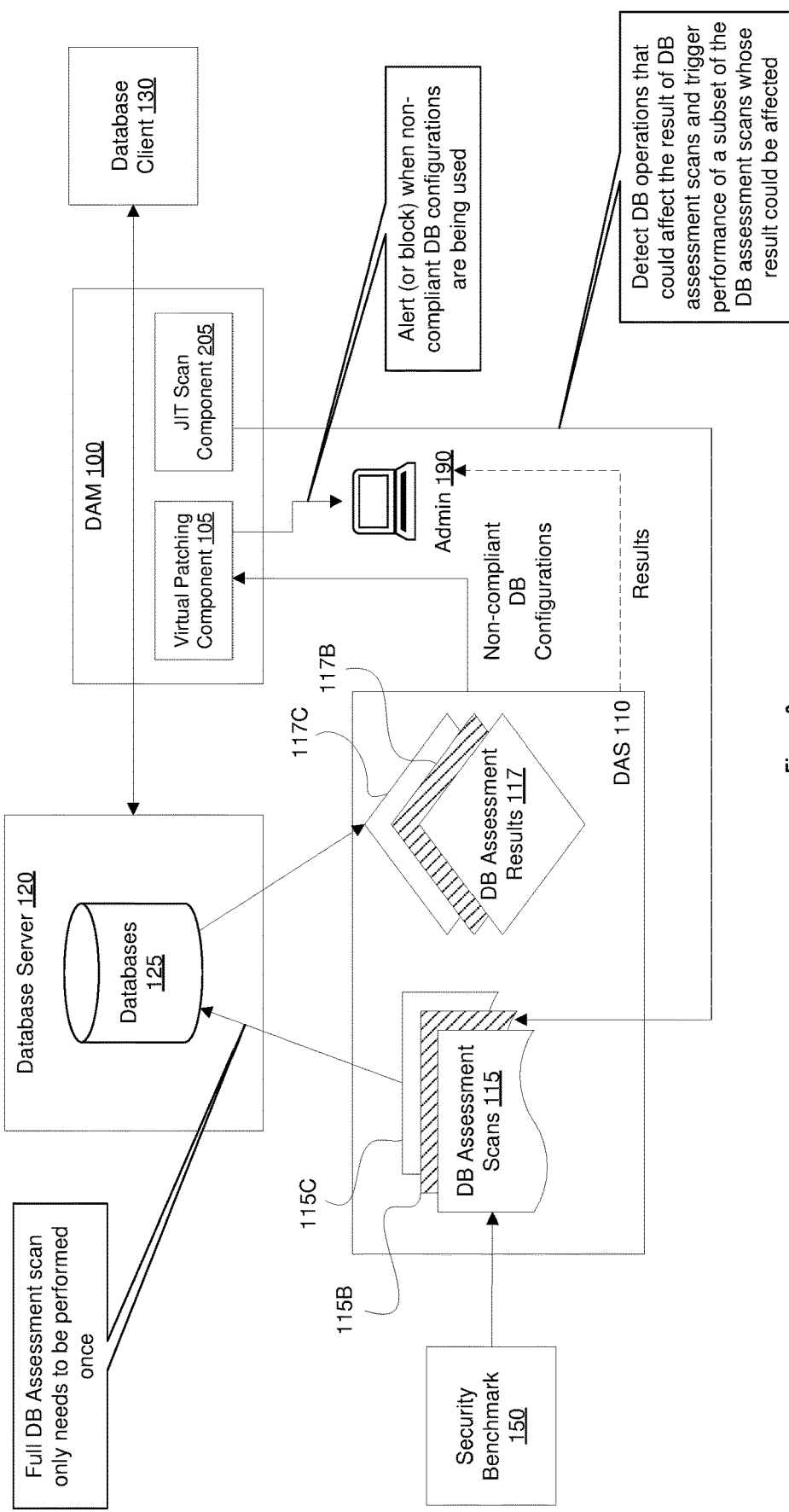
FIG. 3 is a block diagram of a system that provides virtual patching and just-in-time database assessment scans, according to some embodiments.

FIG. 3 is a block diagram of a system that provides virtual patching and just-in-time database assessment scans, according to some embodiments. As shown in the diagram, the system includes similar components to those shown in FIG. 1 such as a DAM 100, a DAS 110, a database server 120, and a database client 130. These components generally operate in a similar manner as described above with reference to FIG. 1 and FIG. 2, and thus only the differences are highlighted below for the sake of brevity. In this embodiment, the DAM 100 includes a virtual patching component 105 and a JIT scan component 205. As will be further described herein below, these components can work in conjunction with each other to provide real-time continuous database compliance. The JIT scan component 205 monitors accesses to the database 125 to detect for occurrences of database operations that could affect the result of a database assessment scan. When the JIT scan component 205 detects an occurrence of a database operation that could potentially affect the result 117 of at least one database assessment scan 115, it triggers performance of only those database assessment scans 115 whose results 117 could be affected (e.g., by causing the DAS 110 to perform those database assessment scans 115). The DAS 110 may then provide the non-compliant database configurations identified by those database assessment scans 115 to the virtual patching component 105 (the DAS 110 may also provide the results 117 of the database assessment scans 115 (e.g., including the non-compliant database configurations) to an administrator 190 or other entity responsible for collecting and/or analyzing the results 117). The virtual patching component 105 may then determine security rules 107 for detecting occurrences of database operations that make use of these non-compliant database configurations and apply the security rules while monitoring accesses to the database 125. Thus, the JIT scan component 205 and the virtual patching component 105 can work in conjunction to keep the results 117 of the database assessment scans 115 updated and to detect when non-compliant database configurations identified by the results 117 are being used. This provides continuous database security and compliance, as any changes in the compliance status of the database 125 will be detected in real-time (e.g., as database operations occur—without having to wait until the next scheduled full database assessment scan) and controls will be put in place to detect when any of the non-compliant database configurations are being used. This is in contrast to the existing mechanisms where the compliance status of a database 125 is only determined during a scheduled full database assessment scan and where the database 125 is vulnerable to security breaches until a DBA or other database expert manually reconfigures the database 125 to be compliant. In one embodiment, the DAM 100 includes (e.g., in addition to the virtual patching component 105 and/or the JIT scan component 205) a compliance alert component 210 (e.g., as described above with reference to FIG. 2) that generates an alert when it detects an occurrence of a database operation that will affect the result 117 of a database assessment scan 115. This provides the additional benefit that an alert can be generated when the compliance status of the database 125 changes without having to rerun the database assessment scans 115.

In one embodiment, the virtual patching component 105 and/or the compliance alert component 210 can provide information regarding the users and/or database operations that cause (or potentially cause) the results 117 of the database assessment scans 115 to be affected to an analytics tool (not shown) that analyzes the database activity (e.g. using machine learning techniques) so that the analytics tool can scrutinize those users and/or those types of database operations more closely.

Figure 4:
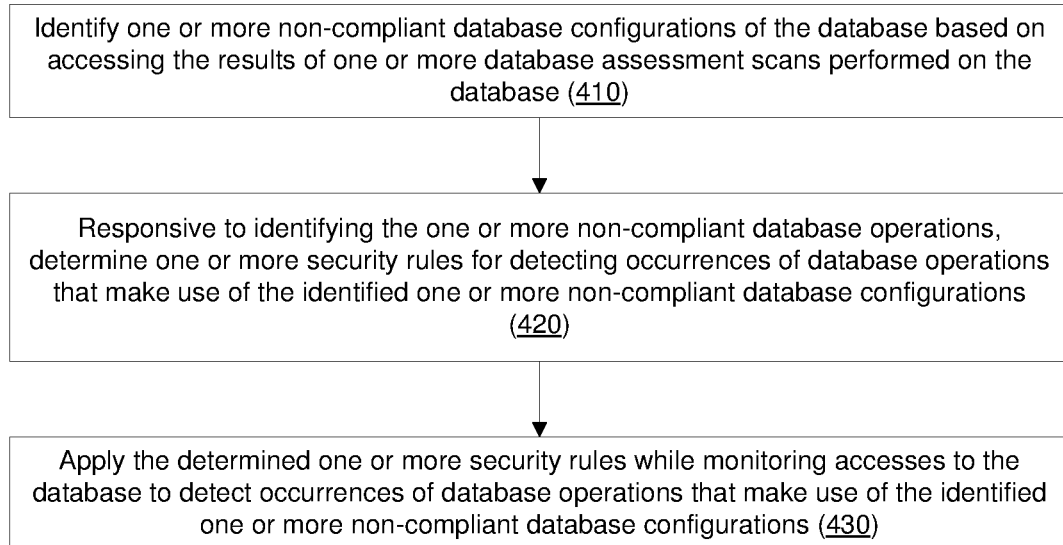
FIG. 4 is a flow diagram of a process for implanting virtual patching for database compliance, according to some embodiments.

FIG. 4 is a flow diagram of a process for implanting virtual patching for database compliance, according to some embodiments. In one embodiment, the process is implemented by a DAM (e.g., virtual patching component 105 of the DAM 100)—which may be part of an enterprise security system.

At block 410, the DAM identifies one or more non-compliant database configurations of the database based on accessing the results of one or more database assessment scans performed on the database. At block 420, responsive to identifying the one or more non-compliant database operations, the DAM determines one or more security rules for detecting occurrences of database operations that make use of the identified one or more non-compliant database configurations. At block 430, the DAM applies the determined one or more security rules while monitoring accesses to the database to detect occurrences of database operations that make use of the identified one or more non-compliant database configurations.

Figure 5:
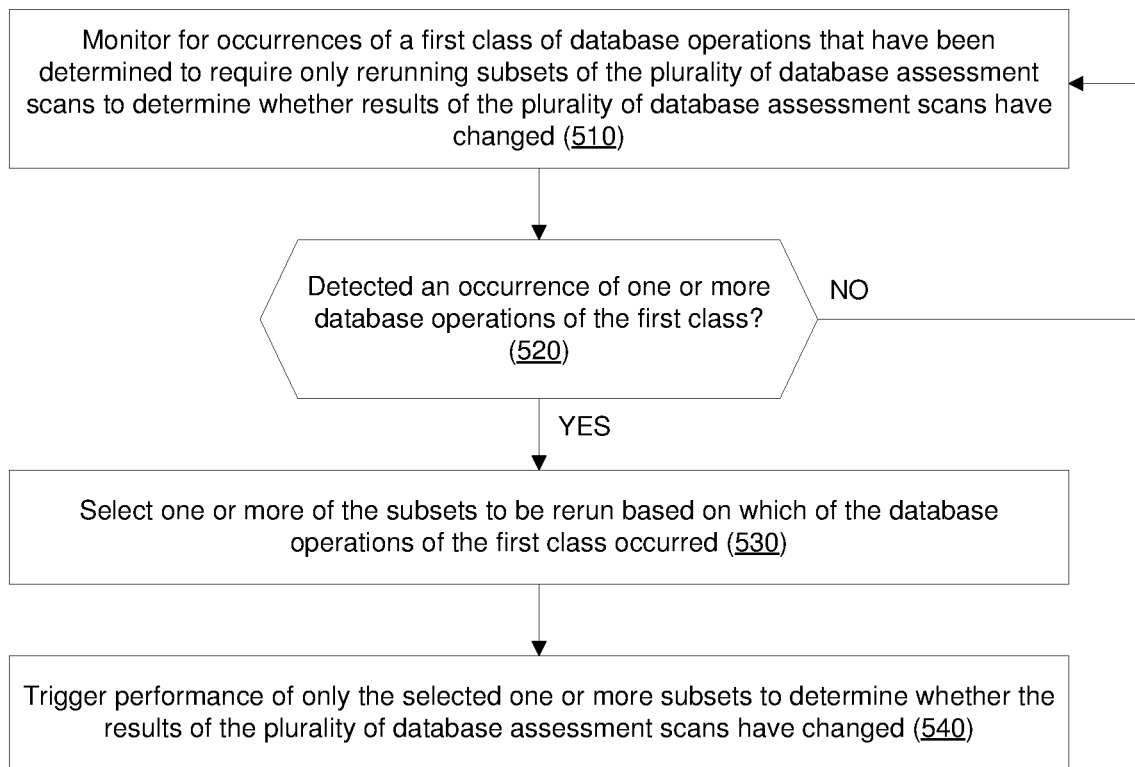
FIG. 5 is a flow diagram of a process for implementing just-in-time scanning, according to some embodiments.

FIG. 5 is a flow diagram of a process for implementing just-in-time scanning, according to some embodiments. In one embodiment, the process is implemented by a DAM (e.g., JIT scan component 205 of the DAM 100)—which may be part of an enterprise security system.

At block 510, the DAM monitors for occurrences of a first class of database operations that have been determined to require only rerunning subsets of the plurality of database assessment scans to determine whether results of the plurality of database assessment scans have changed. At decision block 520, the DAM determines whether it has detected an occurrence of one or more database operations of the first class. If not, the DAM continues to monitor for occurrences of the first class of database operations. If the DAM has detected an occurrence of one or more database operations of the first class, then at block 530, the DAM selects one or more of the subsets to be rerun based on which of the database operations of the first class occurred. At block 540, the DAM triggers performance of only the selected one or more subsets to determine whether the results of the plurality of database assessment scans have changed (rather than waiting for an independent event (e.g., a periodically scheduled full database assessment scan) to rerun all of the plurality of database assessment scans).

Figure 6:
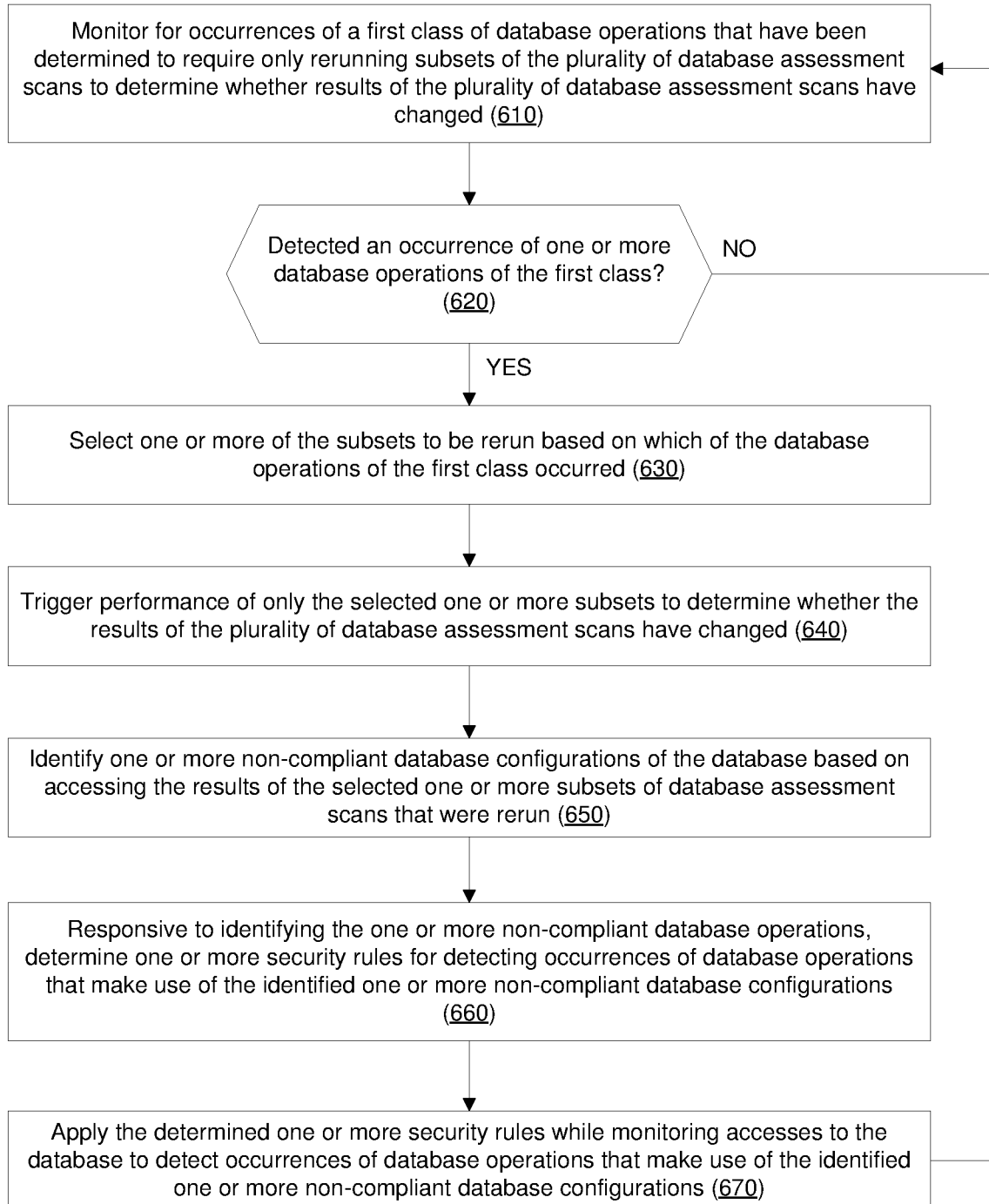
FIG. 6 is a flow diagram of a process for implementing real-time continuous database compliance, according to some embodiments.

FIG. 6 is a flow diagram of a process for implementing real-time continuous database compliance, according to some embodiments. In one embodiment, the process is implemented by a DAM (e.g., JIT scan component 205 and virtual patching component 105 of the DAM 100)—which may be part of an enterprise security system.

At block 610, the DAM monitors for occurrences of a first class of database operations that have been determined to require only rerunning subsets of the plurality of database assessment scans to determine whether results of the plurality of database assessment scans have changed. At block 620, the DAM determines whether it has detected an occurrence of one or more database operations of the first class. If not, the DAM continues to monitor for occurrences of the first class of database operations (back to block 610). If the DAM has detected an occurrence of one or more database operations of the first class, then at block 640, the DAM selects one or more of the subsets to be rerun based on which of the database operations of the first class occurred. At block 640, the DAM triggers performance of only the selected one or more subsets to determine whether the results of the plurality of database assessment scans have changed (rather than waiting for an independent event (e.g., a periodically scheduled full database assessment scan) to rerun all of the plurality of database assessment scans).

At block 650, the DAM identifies one or more non-compliant database configurations of the database based on accessing the results of the selected one or more subsets of database assessment scans that were rerun. At block 660, responsive to identifying the one or more non-compliant database operations, the DAM determines one or more security rules for detecting occurrences of database operations that make use of the identified one or more non-compliant database configurations. At block 670, the DAM applies the determined one or more security rules while monitoring accesses to the database to detect occurrences of database operations that make use of the identified one or more non-compliant database configurations.

Figure 7:
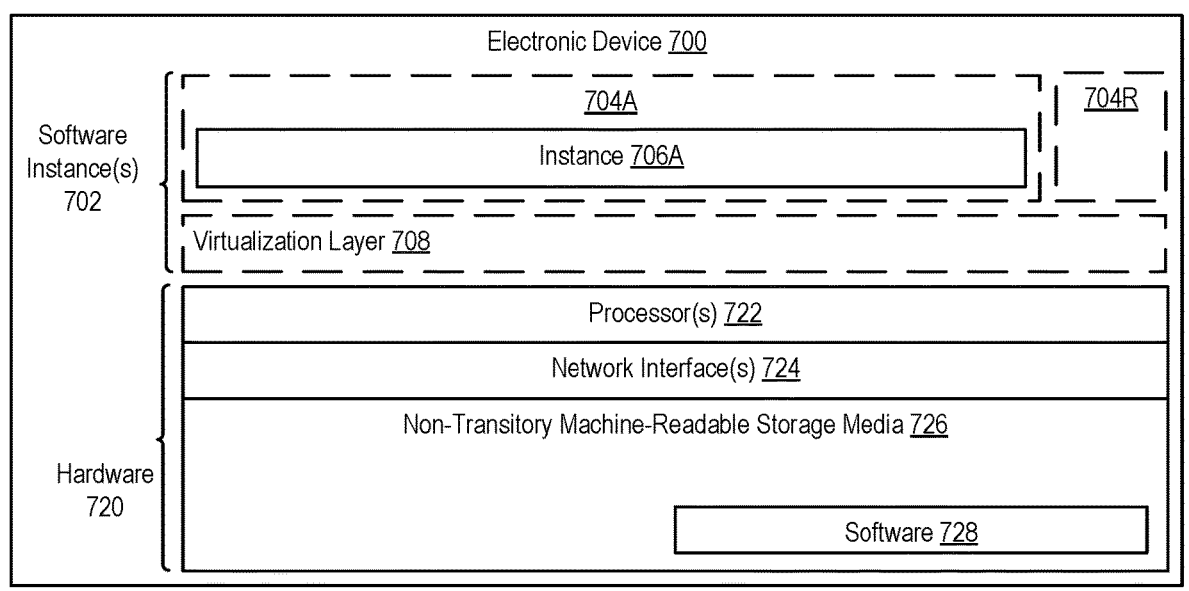
FIG. 7 is a block diagram illustrating an electronic device, according to some embodiments.

FIG. 7 is a block diagram illustrating an electronic device, according to some embodiments. FIG. 7 includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). Software 728 can include code, which when executed by hardware 720, causes the electronic device 700 to perform operations of one or more embodiments described herein. Thus, as previously described, the DAM 100 and/or DAS 110 may be implemented in one or more electronic devices. In addition, the database server 120 and the database client 130 may each be implemented in a different electronic device (respectively referred to as a server electronic device and a client electronic device). While in some embodiments the database server 120 is implemented on a different electronic device than both the DAS 110 and the DAM 100, alternative embodiments may distribute the operations differently (e.g., one, multiple, or all the components of the DAS 110 and/or DAM 100 may be implemented on the same electronic device as the database server 120).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 404A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a security system implemented by one or more electronic devices for selectively triggering different ones of a plurality of database assessment scans for a database and detecting when non-compliant database configurations of the database are being used, the method comprising:
    monitoring for occurrences of a first class of database operations that have been determined to require only rerunning subsets of the plurality of database assessment scans to determine whether results of the plurality of database assessment scans have changed, wherein different database operations of the first class require different subsets of the plurality of database assessment scans to be rerun to determine whether the results of the plurality of database assessment scans have changed;
    responsive to detecting an occurrence of one or more database operations of the first class, selecting one or more of the subsets to be rerun based on which of the database operations of the first class occurred;
    triggering performance of only the selected one or more of the subsets to determine whether the results of the plurality of database assessment scans have changed;
    identifying one or more non-compliant database configurations of the database based on accessing results of the selected one or more of the subsets;
    responsive to identifying the one or more non-compliant database configurations, determining one or more security rules for detecting occurrences of database operations that make use of the identified one or more non-compliant database configurations; and
    applying the determined one or more security rules while monitoring accesses to the database to detect occurrences of database operations that make use of the identified one or more non-compliant database configurations.

2. The method of claim 1, further comprising:
    monitoring for occurrences of a second class of database operations that have been determined not to require rerunning of any of the plurality of database assessment scans to know that a result of at least one of the plurality of database assessment scans will be affected; and
    responsive to detecting an occurrence of one or more database operation of the second class, generating an alert.

3. The method of claim 1, wherein the triggering performance of only the selected one or more of the subsets is responsive to detecting an occurrence of a single one of the database operations of the first class.

4. The method of claim 1, wherein the triggering performance of only the selected one or more of the subsets is responsive to detecting a threshold number of occurrences of the database operations of the first class.

5. The method of claim 1, wherein the triggering performance of only the selected one or more of the subsets is responsive to a time period expiring.

6. The method of claim 1, wherein the selecting including selecting one of the subsets that includes a database assessment scan from the plurality of database assessment scans that identifies non-compliant user privilege configurations responsive to detecting an occurrence of a database operation of the first class that grants a privilege to a user.

7. The method of claim 1, wherein the selecting including selecting one of the subsets that includes a database assessment scan from the plurality of database assessment scans that identifies non-compliant user profile configurations responsive to detecting an occurrence of a database operation of the first class that creates or modifies a user profile.

8. The method of claim 1, wherein the selecting including selecting one of the subsets that includes a database assessment scan from the plurality of database assessment scans that identifies non-compliant system parameter settings responsive to detecting an occurrence of a database operation of the first class that modifies a system parameter.

9. The method of claim 1, wherein the selecting includes accessing a mapping of different ones of the database operations of the first class to different ones of the plurality of database assessment scans.

10. The method of claim 1, wherein the determined one or more security rules include a security rule to generate an alert if a user of the database attempts to log in to the database using a default password if a non-compliant database configuration where the user has a default password is identified.

11. The method of claim 1, wherein the determined one or more security rules include a security rule to generate an alert if an unauthorized database link is being accessed if a non-compliant database configuration where the unauthorized database link is exposed is identified.

12. The method of claim 1, wherein the determined one or more security rules include a security rule to generate an alert if a user of the database uses a system privilege that was granted only via public role if a non-compliant database configuration where system privileges are granted to the public role is identified.

13. The method of claim 1, wherein the determined one or more security rules include a security rule to generate an alert if a user of the database accesses an unauthorized system table if a non-compliant database configuration where the user is authorized to access the unauthorized system table is identified.

14. The method of claim 1, wherein the determined one or more security rules include a security rule to block database operations that make use of a non-compliant database configuration.

15. A set of one or more non-transitory computer readable storage media storing instructions which, when executed by one or more processors of one or more computing devices, causes the one or more computing devices to perform operations for selectively triggering different ones of a plurality of database assessment scans for a database and detecting when non-compliant database configurations of the database are being used, the operations comprising:
  monitoring for occurrences of a first class of database operations that have been determined to require only rerunning subsets of the plurality of database assessment scans to determine whether results of the plurality of database assessment scans have changed, wherein different database operations of the first class require different subsets of the plurality of database assessment scans to be rerun to determine whether the results of the plurality of database assessment scans have changed;
  responsive to detecting an occurrence of one or more database operations of the first class, selecting one or more of the subsets to be rerun based on which of the database operations of the first class occurred;
  triggering performance of only the selected one or more of the subsets to determine whether the results of the plurality of database assessment scans have changed;
  identifying one or more non-compliant database configurations of the database based on accessing results of the selected one or more of the subsets;
  responsive to identifying the one or more non-compliant database configurations, determining one or more security rules for detecting occurrences of database operations that make use of the identified one or more non-compliant database configurations; and
  applying the determined one or more security rules while monitoring accesses to the database to detect occurrences of database operations that make use of the identified one or more non-compliant database configurations.

16. The set of one or more non-transitory computer readable storage media of claim 15, wherein the instructions, when executed by the one or more processors, causes the one or more computing devices to perform further operations comprising:
  monitoring for occurrences of a second class of database operations that have been determined not to require rerunning of any of the plurality of database assessment scans to know that a result of at least one of the plurality of database assessment scans will be affected; and
  responsive to detecting an occurrence of one or more database operation of the second class, generating an alert.

17. The set of one or more non-transitory computer readable storage media of claim 15, wherein the triggering performance of only the selected one or more of the subsets is responsive to detecting an occurrence of a single one of the database operations of the first class.

18. A computing device configured to selectively trigger different ones of a plurality of database assessment scans for a database and detect when non-compliant database configurations of the database are being used, the computing device comprising:
  one or more processors; and
  a non-transitory machine-readable storage medium having instructions stored therein, which when executed by the one or more processors, causes the computing device to:
    monitor for occurrences of a first class of database operations that have been determined to require only rerunning subsets of the plurality of database assessment scans to determine whether results of the plurality of database assessment scans have changed, wherein different database operations of the first class require different subsets of the plurality of database assessment scans to be rerun to determine whether the results of the plurality of database assessment scans have changed;
    responsive to detecting an occurrence of one or more database operations of the first class, select one or more of the subsets to be rerun based on which of the database operations of the first class occurred;
    trigger performance of only the selected one or more of the subsets to determine whether the results of the plurality of database assessment scans have changed;
    identify one or more non-compliant database configurations of the database based on accessing results of the selected one or more of the subsets;

responsive to identifying the one or more non-compliant database configurations, determine one or more security rules for detecting occurrences of database operations that make use of the identified one or more non-compliant database configurations; and apply the determined one or more security rules while monitoring accesses to the database to detect occurrences of database operations that make use of the identified one or more non-compliant database configurations.

19. The computing device of claim 18, wherein the instructions, when executed by the one or more processors, further causes the computing device to:

monitor for occurrences of a second class of database operations that have been determined not to require rerunning of any of the plurality of database assessment scans to know that a result of at least one of the plurality of database assessment scans will be affected; and responsive to detecting an occurrence of one or more database operation of the second class, generate an alert.

20. The computing device of claim 18, wherein the determined one or more security rules include a security rule to block database operations that make use of a non-compliant database configuration.

* * * * *